No. 665,094. Patented Jan. 1, 1901.
J. H. HERTNER.
MEANS FOR ELECTRICAL CAR PROPULSION.
(Application filed Aug. 6, 1900.)

(No Model.) 2 Sheets—Sheet 1.

No. 665,094. Patented Jan. 1, 1901.
J. H. HERTNER.
MEANS FOR ELECTRICAL CAR PROPULSION.
(Application filed Aug. 6, 1900.)
(No Model.) 2 Sheets—Sheet 2.

WITNESSES:
Carl H. Noe.
C. Theobald

J. H. HERTNER,
INVENTOR.
By R. J. McCarty,
ATTORNEY.

UNITED STATES PATENT OFFICE.

JOHN H. HERTNER, OF CLEVELAND, OHIO.

MEANS FOR ELECTRICAL CAR PROPULSION.

SPECIFICATION forming part of Letters Patent No. 665,094, dated January 1, 1901.

Application filed August 6, 1900. Serial No. 26,012. (No model.)

*To all whom it may concern:*

Be it known that I, JOHN H. HERTNER, a citizen of the United States, residing at Cleveland, in the county of Cuyahoga and State of Ohio, have invented certain new and useful Improvements in Means for Electrical Car Propulsion; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to electrical means for propelling cars, and comprises a system in which is utilized a continuously-running alternate-current motor with clutch mechanism for transmitting different speeds to the car. The shaft of a continuously-running alternate-current motor is connected to the axle of the car-truck by means of gearing which may be thrown in and out of gear by clutch mechanism, either mechanical or electrical, said clutch mechanism being located on the motor-shaft.

Among the advantages of the present invention may be mentioned, first, an avoidance of electrolysis by the use of said system; second, a very considerable decrease in the use of copper feed-wires, which is due to the possibility of using a high voltage in the feeder system; third, a greater simplicity is obtained in the motor, no commutator being required and, fourth, the braking effect on the car when changing from a higher to a lower speed on the controller, the motor acting as a brake.

Either form of alternate-current motor, induction or synchronous, may be employed for the purposes of my invention. Such motor is kept in continual rotation as long as a car is in service on the track, and by means of clutch mechanism, either mechanical or magnetic, the power is transmitted to the axle of the running-gear. A small dynamo driven by the motor or a storage battery may furnish direct current to operate the clutches.

Three clutches are shown in the present instance for as many different speeds.

Preceding a detail description of my invention reference is made to the accompanying drawings, of which—

Figure 1:
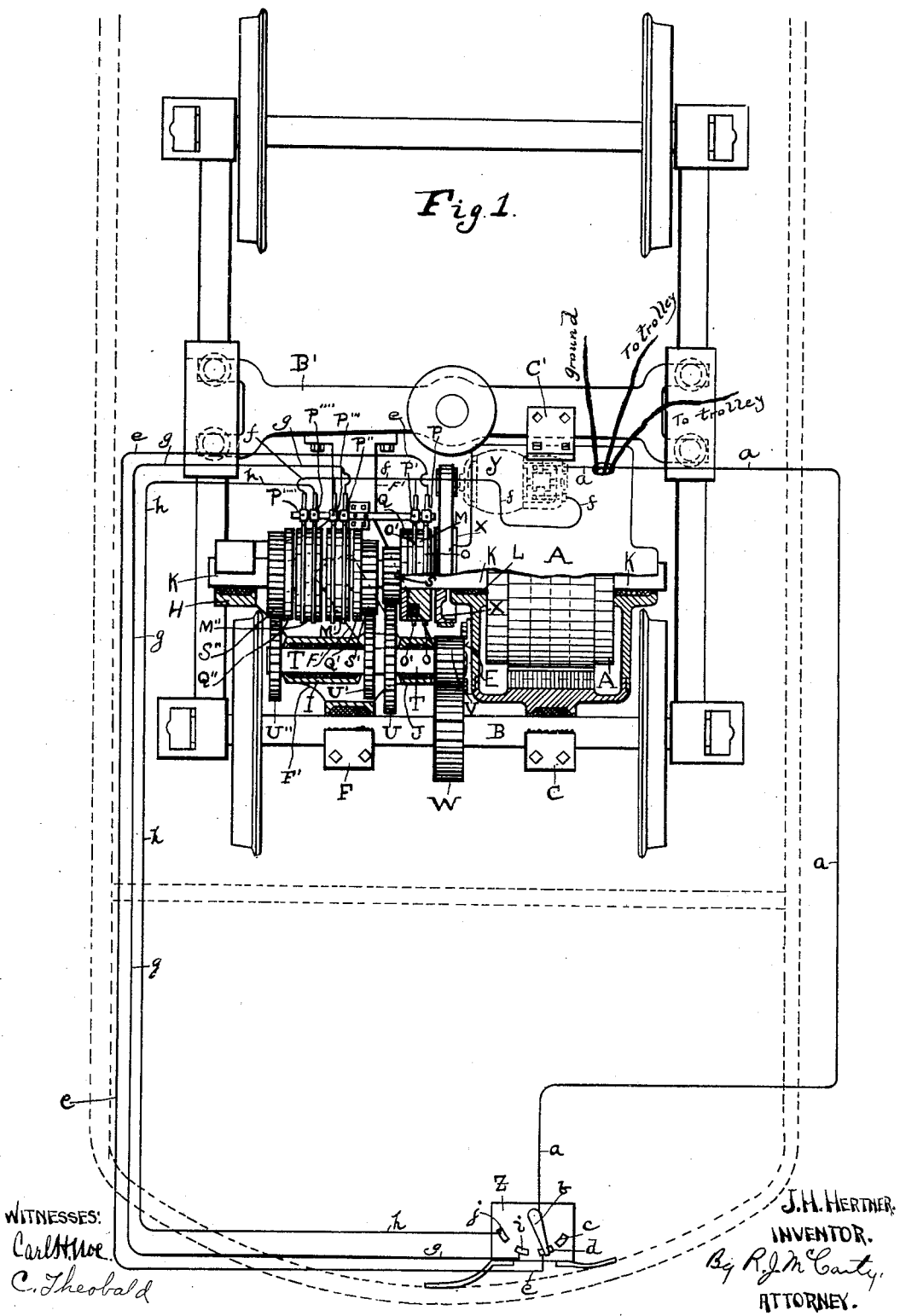
Figures 2, 3:
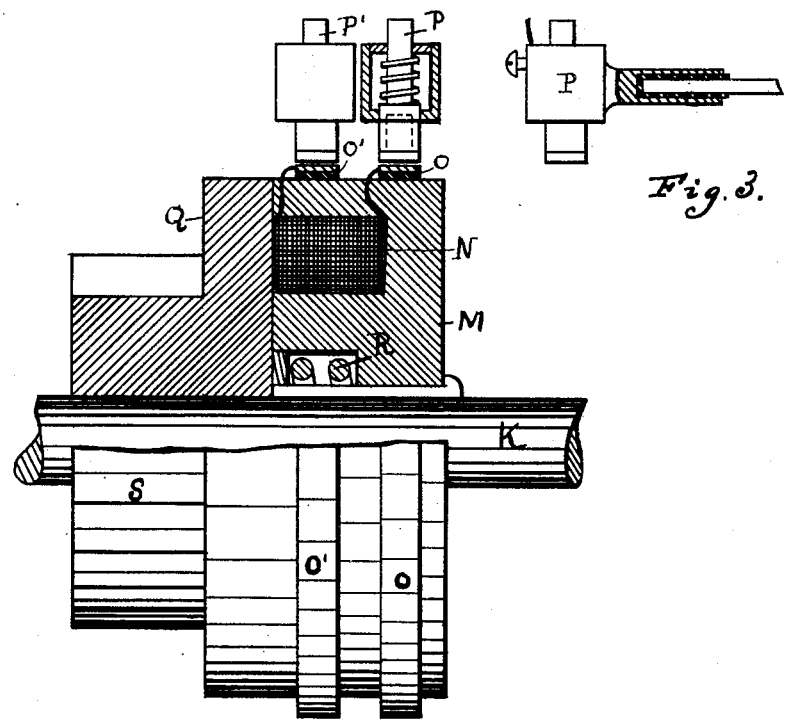

Figure 1 is a plan view, partly in section, showing my system of electrical car propulsion. Fig. 2 is a partial sectional elevation of one of the clutch mechanisms, the other two clutch mechanisms being substantially the same. Fig. 3 is a partial sectional view of one of the carbon contacts of the clutch mechanism.

In Fig. 1 a plan view of a car-truck is shown, to which is applied a polyphase induction-motor A—say of fifty horse-power capacity—which is suspended from the truck-axle B by means of bearing C on one side and is attached to the truck-frame B' by means of bearing C' on the other side. Secured to the head of the motor at E and swinging on the truck-axle at F is an irregular-shaped casting F', which contains the bearings H, I, and J. The two last-named bearings afford bearings for the shaft T, which will presently be referred to. The motor-shaft K extends out beyond the motor-bearing L to the bearing H. On shaft K there are firmly secured three steel pieces M, M', and M'', a sectional view of which is shown in Fig. 2. These pieces constitute magnetic clutches. A coil of wire N has its ends attached to two insulated brass rings O O', each of which is supplied with a carbon-tipped contact P P'. Current sent in, as hereinafter shown, magnetizes the coil N, and thus the clutch member M becomes a magnet and pulls down the armature Q against the pressure of a spring R in the side of the magnet, Fig. 2. The pressure may be ten thousand to twelve thousand pounds, thus causing the armature Q to adhere to M firmly. The armature turns loosely on the shaft K. To the said armature is attached a gear S. To armature Q' is attached a larger gear S', and to armature Q'' is attached a still larger gear S'', all of said gears being loose on the motor-shaft K. When the smallest gear S turns with the motor-shaft, motion is transmitted to an intermediate shaft T from the motor through gear S, which meshes with a large spur-wheel U on said shaft T, or a greater speed may be transmitted to said shaft T through gear S', which meshes with a spur-wheel U' on shaft T, wheel U' being of less diameter than wheel U, or a still greater speed may be imparted to shaft T through gear S'', which meshes with a spur-gear U'' on shaft T, spur-wheel U'' being of less diameter than wheel U'. On shaft T there is a spur-pinion V, that meshes with a large spur-wheel W on the truck-axle B and through which motion is transmitted from the shaft T to axle B. The motor-shaft K supports a pulley X, which is belted to a small direct-current generator Y. (Shown in broken lines.) This generator is located above the truck within the car. From generator Y to a three-way switch Z on the motorman's platform there is a wire $a$, leading to switch-handle $b$.

As shown in the drawings, contact $c$ is "off," contact $d$ is the first speed, and wire $e$ leads from $d$ to contact P. Another wire $f$ leads from the generator Y to contacts P', P''', and P'''' of the three clutches M M' M''. Wires $g$ and $h$ lead from switch-contacts $i$ and $j$ to contacts P'' and P'''', respectively. The motor on sixty cycles runs at about five hundred and seventy-five revolutions per minute. The first speed will propel the car at from three to four miles per hour; the second speed at from seven to eight miles per hour, and the third speed at from fourteen to fifteen miles per hour.

On starting the car for a day's run the motor is put into operation by means of a switch. (Not shown.) When the motor is running on full-line pressure, the switch-handle $b$ is turned to contact $d$ and the clutch M begins to operate. As this is geared pretty high, practically the same effect is obtained as with the ordinary direct-current series motor—a large starting torque. When the car has reached its lowest speed, the lever $b$ may be moved to contact $i$ and a higher speed attained, and so the third or highest speed may be obtained by moving the lever $b$ to contact $j$. On slowing down, by turning the handle $b$ back one notch will throw another set of gears into operation, with the result that for a time the motor is compelled to run faster than five hundred and seventy-five revolutions per minute, thus practically charging the line and braking the car.

Having described my invention, I claim—

1. In an electrical system of car propulsion, the combination of a continuously-running alternating-current motor, magnetic clutches rigidly secured to the shaft of said motor, a direct-current generator driven from said alternating-current motor and furnishing a separate circuit for the clutch mechanism, the said separate circuit being distinct from the motor-circuit, and means for driving the truck-axle at variable speeds from said clutch mechanism.

2. In an electrical system of car propulsion, the combination of a continuously-running alternating-current motor, clutch devices mounted on the shaft of said motor, a direct-current generator driven from said alternating-current motor and providing a separate circuit for the clutch mechanism, differential gearing between the motor-shaft and the axle of the car-truck by means of which variable speeds are transmitted to the axle of the car-truck, a switch, and conductors between said switch and the clutch devices by means of which said differential gearing is actuated to impart said variable speeds to the truck-axle.

In testimony whereof I affix my signature in presence of two witnesses.

JOHN H. HERTNER.

Witnesses:
R. J. McCarty,
Carl H. Noe.